Figure 1:
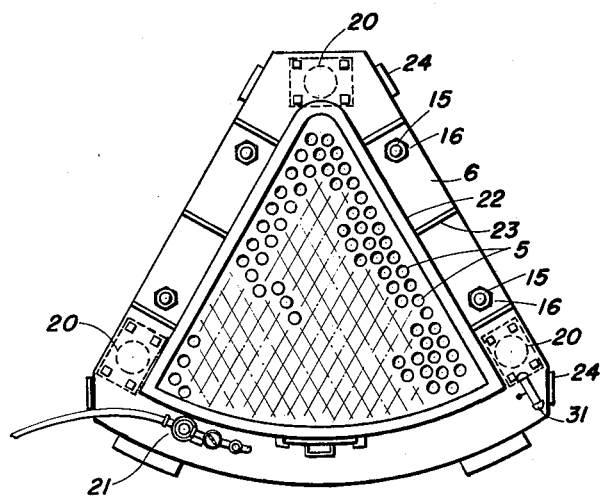

May 23, 1961 R. C. HOWELL 2,985,341
REACTOR CATALYST LOADER
Filed May 29, 1958 3 Sheets-Sheet 1

INVENTOR.
Robert C. Howell
BY
Attorney

May 23, 1961 R. C. HOWELL 2,985,341
REACTOR CATALYST LOADER
Filed May 29, 1958 3 Sheets-Sheet 2

INVENTOR.
Robert C. Howell
BY
Attorney

May 23, 1961 R. C. HOWELL 2,985,341
REACTOR CATALYST LOADER
Filed May 29, 1958 3 Sheets-Sheet 3
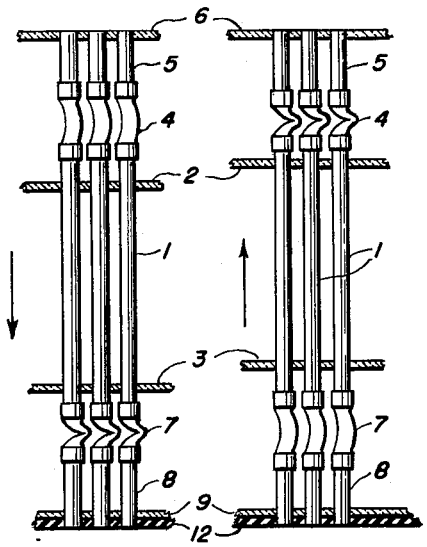
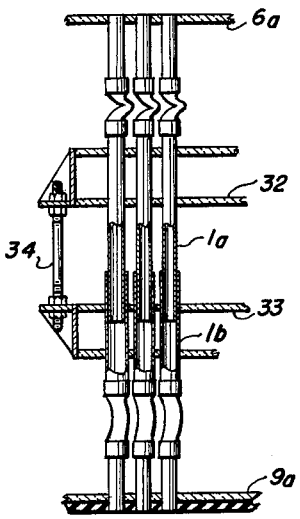
Fig. 5    Fig. 6    Fig. 7
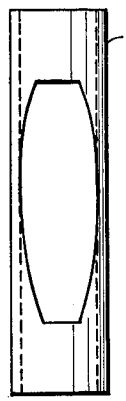
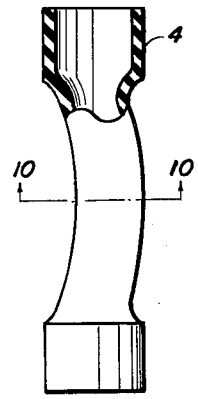
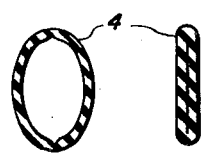
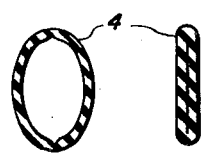
Fig. 8    Fig. 9    Fig. 12    Fig. 13
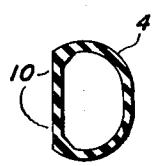
Fig. 10    Fig. 11
INVENTOR.
Robert C. Howell
BY
Attorney United States Patent Office 2,985,341
Patented May 23, 1961

2,985,341
REACTOR CATALYST LOADER
Robert C. Howell, Houston, Tex., assignor, by mesne assignments, to James H. Howard, Houston, Tex.
Filed May 29, 1958, Ser. No. 738,782
19 Claims. (Cl. 222—267)

This invention relates to improved mechanism for loading measured charges and to control valving therefor.

The loading apparatus has been devised particularly but is not limited for use with equipment commonly employed in the petrochemical industry for obtaining a reaction in the presence of a catalyzer. A typical reactor is a vessel on the order of twenty feet tall and ten feet in diameter having top and bottom headers joined by a circular bank of more than two thousand closely spaced vertical tubes containing the catalyzer and through which a fluid flows. In the production, for example, of ethylene oxide and following an operating interval of from thirty to ninety days, the supply of catalyzer needs replenishment or replacement and heretofore that has been done by several workmen using buckets and funnels for individually placing in each tube a catalyzer in the nature of a dry friable granular material and in successive batches of varying grain size, the first charge usually being of larger grains than later charges. A relatively long shutdown time is involved, with considerable production loss.

An object of the present invention is to reduce the idle interval of plant operation, with a conservation of manpower and a better control of charge measurements, through the use of a machine by which a large number of reactor tubes are concurrently and quickly charged with equal and measured quantities.

Another object of the invention is to provide an improved loader comprising a group of tubular units corresponding in number and disposition for mating relation with the reactor tubes to be charged and each tubular unit including an intermediate charge measuring tube of given volume joined at its opposite ends with aligned inlet and outlet nipples by flexible walled couplings molded or preshaped to a form which responds to a axial compression and tension forces for controlling constriction of the passageway therethrough and for alternately valving the inlet and the outlet in an out of phase relationship whereby the dump end of the measuring tube is closed while its inlet is open for receiving a charge and the top inlet is thereafter closed against additional entry while the bottom outlet is in open gravity dump relation and wherein the valve members project but slightly beyond the outside tube diameter within the small intervening clearance between the intimately spaced apart tubes of the groups.

A further object of the invention is to provide an inexpensive multiple tube loader assembly which can be power actuated for unisonal valve operation and which has a number of interchangeable valves, each being a simple low cost and easily molded rubber unit of preshaped tubular form having opposite connector ends and an intermediate laterally offset bowed or foldable portion capable of bending upon itself for a closing action when its opposite ends are moved toward one another.

Figure 2:
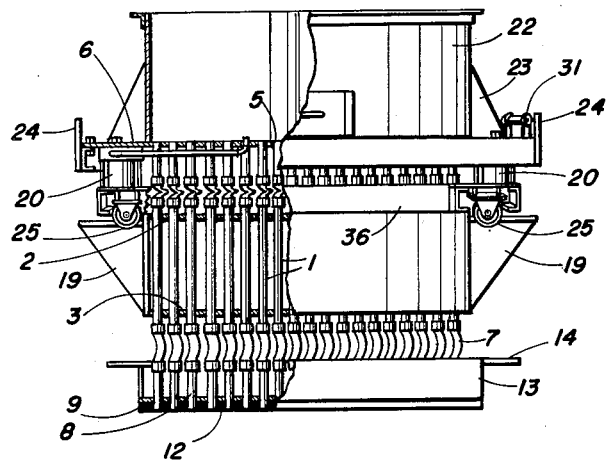
Figure 3:
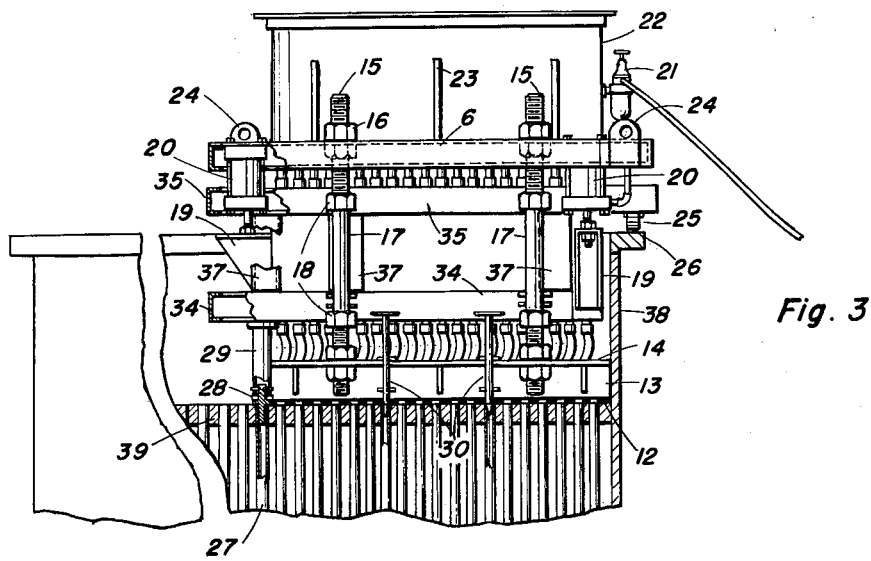
Figure 4:
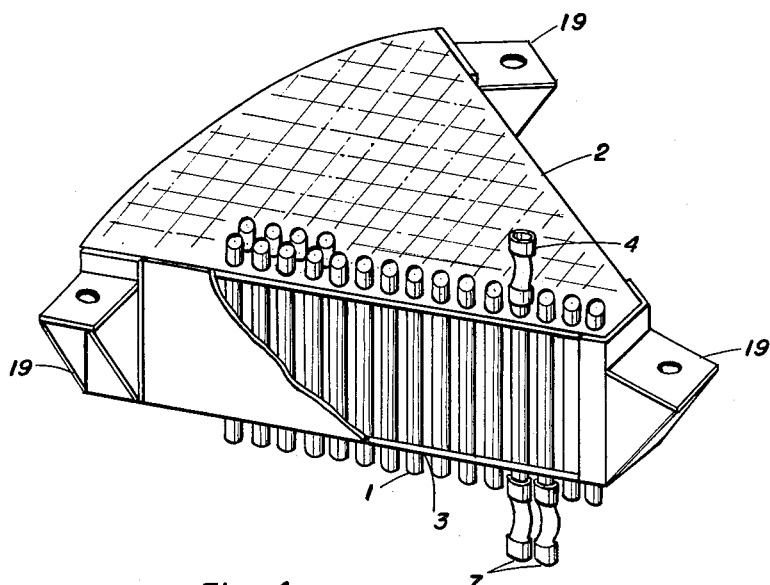

Other objects and advantages of the invention will be self evident from the accompanying drawings wherein Fig. 1 is a top plan view of the assembly embodying the invention; Fig. 2 is a front elevation with parts broken away and shown in section of the improved machine; Fig. 3 shows the machine in side elevation mounted in position on a reactor and with some parts in section; Fig. 4 is a detail perspective view on a larger scale showing the measuring tube bundle; Figs. 5 and 6 are fragmentary vertical sections showing a few of the measuring tubes and the control valves and respectively showing the bottom dump valves closed with the top inlet valves open and the bottom dump valves open with the top inlet valves closed; Fig. 7 is a fragmentary vertical section of a modified measuring tube arrangement; Fig. 8 is a side elevation of a molded valve unit; Fig. 9 is a side elevation of the same valve unit at a ninety degree angle to Fig. 8 and with a part in section; Figs. 10 and 11 are transverse views as on line 10—10 of Fig. 9 with the valve in open position and in closed position respectively; and Figs. 12 and 13 are transverse sections showing a modified rubber valve unit in fully open and fully closed positions respectively.

The loading machine may embody a group of tube assemblies corresponding in number to those of the tubular reactor but for economy of manufacture the machine is shown in the drawing as having a series of tubes of like number and disposition to a sector shaped fragment of the total number of tubes in a circular reactor bank. If the tube bank is divided into sectors having an equal number of tubes, each group can be serviced one at a time and the position of the loading machine can be shifted successively between the several groups of the bank. By the use of an overhead crane one loading machine can be conveniently handled to serve a large number of reactors installed in the same plant, since more than one reactor is unlikely to need attention at any one time.

The machine consists of a large number of tubular elements arranged in closely spaced apart parallel relation and since they are duplicative of one another, only a few of the tubular elements are illustrated in detail for the sake of simplicity in some views of the drawing. Each tubular element includes an intermediate measuring tube 1 whose length and diameter determine the volume of material to be charged in each cycle. When tube length is fixed, the tubes 1 are assembled in a bundle in vertical alignment with reactor tubes and inwardly of their opposite ends the tubes extend through openings in and are secured, as by welding, to a pair of vertically spaced apart mounting plates 2 and 3. The upper end of each tube has fitted to it the adjacent connector end of a flexible coupler tube 4 whose opposite connector end is fitted on a tubular nipple 5 depending from an upper plate 6. Similarly, the lower end of each measuring tube 1 has fitted to it the upper end of a flexible coupling tube 7 whose opposite end is fitted on a tubular nipple 8 fixed in upstanding relation to a lower mounting plate 9.

The spacing between adjacent ends of the measuring tube 1 and the depending nipple 5 is thus bridged by the flexible walled coupling 4 and likewise the space between adjacent ends of the measuring tube 1 and the upstanding nipple 8 is bridged by the flexible walled coupling 7. The flexible walled coupling in each instance accommodates variation in the space bridged and the vertical spacing between the upper plate 6 and the lower plate 9 is somewhat less than the combined axial length of the end to end succession of tubing sections 1, 5, 8, 4, and 7 if the latter two are fully elongated. Thus by providing for relative vertical movement between the end nipples and the intermediate tube, the mentioned variation in space and length dimensions is compensated for by or rather is taken advantage of for effecting a bending of one or the other of the flexible couplings 4 and 7. If downward vertical movement is imparted through the plates 2 and 3 to the intermediate measuring tubes 1, a tension or pulling force is received by the several upper flexible couplings 4 while the central wall portion of each of the lower couplings 7 is subjected to a compression force between its opposite ends and responds by bending or folding upon itself to thereby restrict the size of the passage therethrough. In this fashion the bottoms of the several measuring tubes 1 are closed and their upper ends are open to receive a charge of material to be later deposited.

When the measuring tubes are full, then an upward movement of the plates 2 and 3 carries the entire bundle of tubes to the upper limit shown in Fig. 6 and in the initial portion of the range of movement the upper flexible wall couplings 4 are placed in compression in their intermediate regions which thereby fold against further descent of material and in the final range of upward travel the lower couplings 7 have their ends spread apart for a distention of the intermediate flexible wall and an opening of the passage for the escape of the measured charges contained within the tubes 1 of the bundle.

For facilitating valve action in response to axial tension and compression forces thereon, the couplings may be molded of rubber or other nonmetallic elastic deformable material, such as Hycar, and to shapes substantially as shown in Figs. 8 and 9. In the completely unstressed position illustrated, the tubular end portions for fitment to the tubes and nipples are joined by an annular wall which has an initial laterally offset bow following a gradual line of curvature offset to one side of the axis of the opposite tubular connector portions. Consequently, when the spacing between the opposite ends is decreased, the intermediate annular wall portion shifts laterally and is folded upon itself in a manner to decrease the size of the passage therethrough. The degree of constriction can be varied in relation to the axial compression force applied and to some extent by the cross sectional shape of the passageway. Thus if the transverse shape is generally elliptical, as shown in Fig. 12, and if additionally the tubular wall along the major axis is slightly weakened, the collapse of the wall portion may bring about a tight face to face contact throughout the major axis for completely sealing the passageway, as indicated in Fig. 13. Ordinarily, a complete sealing will not be required when granular particles are being controlled and restriction to flow at the inlet, for example, will be accomplished if the walls merely apply a radial contraction force on the granules for clamping them against movement. When the intermediate wall portion is molded in cross section to a substantially D-shape, as indicated in Fig. 10, and especially when stiffening fillets, as shown at 10, are provided at the corners of the straight side, then the radial collapse of the wall will occur primarily in the curved wall portion. In the region adjacent the stiffening reinforcements there will be a resistance to bending of the wall so as to leave open spaces, as seen at 11 in Fig. 11, of small size sufficient to provide venting and avoid a dead end pocket.

A feature of importance is that the use of foldable tubular valve elements enables a spacing of tubes close together with intervening clearances considerably less than tube diameters. The space between the adjoining tubes need be no greater than the relatively thin wall thickness at the terminals of the rubber valve element when sleeved on the metal tubes. Further in the interests of minimum spacing, the bowed intermediate portions of the rubber couplings are all laterally offset or project in the same direction from their tube axes whereby their folds have somewhat of an internested relationship with adjoining tubes for bending clearances, as is shown in the drawings.

The tubes and plates heretofore described are preferably formed of light weight aluminum or other suitable metal which remains fairly clean and is unlikely to be adversely affected by or to contaminate materials to be handled.

The bottom plate 9, which makes face to face contact with the upper header of the reactor, is preferably faced with a gasket 12 of soft material, such as a sponge rubber liner, and which is perforated in line with each tube. For stiffening the plate 9, its two straight divergent edges bounding the sector sides and its front arcuate edge have welded thereto the lower edges of upstanding walls 13 and these walls terminate each in a laterally projected flange 14. Each of the side flanges 14 receive the lower ends of a pair of tie bolts 15 whose upper ends extend through a catwalk afforded by marginal portions of the upper plate 6. Pairs of nuts 16 adjustably threaded on opposite ends of the tie bolts 15, are arranged to clamp therebetween the marginal extension of the plate 6 and the marginal flange 14 of the bottom plate 9. These tie bolts hold the upper and lower plates in fixed spaced apart relation and relative nut adjustment enables the vertical spacing to be initially set up in relation to the tube bundle and the flexible valve connections 7 so that one set of the latter will be in axial compression and therefore closed while the other set of couplings is open.

Fitted to each tie bolt is a spacer sleeve 17 fixed to and laterally projected outwardly of the sides of a main frame or carriage assembly. A pair of axially spaced apart nuts 18 may be threaded on the bolts to engage the top and bottom of each sleeve to fix the end plates 6 and 9 in vertically adjusted position in the supporting carriage. Structural steel channels welded together afford the carriage or main frame and comprise a lower pair of channels 34 extending along the two sides of the tube bundle and a similar upper pair of channels 35 whose outward divergent ends are joined by an arcuate band 36. Connecting straps 37 at spaced intervals extend vertically between and are welded to the lower and upper channels 34 and 35.

At each of the three corners of the sector-shaped tube bundle there are secured, as by welding, to the marginal edges of the plates 2 and 3 a supporting bracket or shelf 19 and each receives the lower end of a connecting rod depending downwardly from a piston slidably contained within an air cylinder 20 whose upper end is bolted to the marginal extension of the upper plate 6 and constitutes a double acting motor. Air under pressure is piped to the several cylinders under control of a manual valve 21 for raising and lowering the tube bundle and for suspending the same during use in either its lowered position in which the valves 4 of the lower group are closed and the valves 7 of the upper group are open or in its uppermost position in which the upper inlet valves are closed and the lower dump valves are open.

Extending upwardly from the uppermost plate 6 around the perimeter of the sector-shaped group of filling nipples 5 is a vertical wall 22 suitably braced by gusset plates 23 to form a feed hopper for material to be loaded into the reactor tubes. A series of apertured ears 24 are welded to the upper plate assembly for hooked connection with lifter cables of an overhead crane for handling the assembly and for placing it on and removing it from a reactor vessel. When the assembly is placed inside the top of the reactor, as shown in Fig. 3, a pair of caster wheels or rollers 25 bracketed on and beneath the upper carriage strap 36 at the arcuate front face of the assembly will rest or track on the upper face of a top flange 26 of the reactor cylindrical wall 38. A central tube 27 for bearing support at the upper tube header 39 provides a locating opening to pilot a pivot pin 28 which is secured at the lower end of a vertical stanchion tube 29 depending from the apex of the carriage channels 34. By reason of the bearing locator pin 28 and the caster wheels 25, the carriage and loader assembly can be moved successively between adjoining groups of reactor tubes throughout the entire circle. For locating the assembly at any selected position, there are shown a pair of latch pins 30 slidably carried by the frame channel 34 so that they can be releasably received within the upper ends of selected reactor tubes aligned therewith.

When a charging operation is to be effected, a given supply of material is placed upon the end plate 6 or floor of the feed hopper 22 and the motor control valve 21 is then operated for reciprocating the tube bank between sequential fill and dump positions. In the fill position of the measuring tubes 1, as seen in Fig. 5, the tube bottoms are closed and material can drop from the hopper 22 by gravity for filling each tube. Thereupon the bundle is elevated by actuation of the power pistons for reversing the relationship of the upper and lower valves 4 and 7 and the charge as measured by the chamber space or volume of individual measuring tubes 1, will drop by gravity into the reactor tubes. Since measuring tube volume is predetermined and known, the repetition of the action can take place a given number of times for a desired total charge to each tube. A conventional type of counter 31 can be mounted on the machine for indexing with each cycle of the power actuator and will record the amount of material which has been charged.

When the loader assembly is designed for use with a number of identical reactor vessels and is to load without exception a one-type material, it will be expedient to employ a measuring tube 1 as a single unit of given length. However, there may be conditions which will justify the employment of a variable volume measuring tube which can be set up to any selected capacity for a particular job and a suitable arrangement for that purpose is illustrated in Fig. 7. In this view, the tubular measuring element consists in each instance of a pair of telescopic sections 1ª and 1ᵇ which are in nested overlapping relation. For variation in the extent of overlap and therefore tube volume, the tubes 1ª and 1ᵇ are respectively carried by upper and lower plates 32 and 33, whose ends are adjustably connected by tie rod and nut assemblies 34 by which the upper and lower plates can be shifted toward and from one another and thereby change the effective length of the measuring telescoped tubes 1ª and 1ᵇ. Relative adjustment of the upper and lower plates 32 and 33 should be accompanied by a corresponding adjustment of the fixedly spaced apart relation of the co-operating header plates 6ª and 9ª through their tie rod connections, as previously described.

While only a preferred embodiment of the invention has been specifically referred to herein, it will be understood that such modifications can be made as come within the scope of the appended claims.

What is claimed is:

1. In a charge measuring device, an intermediate tube of predetermined charge volume, an inlet tube having an end thereof in axially spaced relation to one end of said intermediate tube, a collapsible tube having its opposite ends connected with the mentioned ends of the intermediate tube and the inlet tube as a connecting passageway and valve therebetween, an outlet tube having an end thereof in axially spaced relation to the opposite end of said intermediate tube, a collapsible tube having its opposite ends connected to the mentioned end of said outlet tube and said opposite end of the intermediate tube as a connecting passageway and valve therebetween, each of such collapsible tubes comprising a flexible annular wall projecting between the opposite connecting ends thereof and said flexible wall between its ends being expansible for opening its passage upon application through its opposite ends of tension force on the flexible wall and being collapsible for restricting said passage upon application through its opposite ends of compressive force on the flexible wall and means for relatively moving the adjacent tube ends joined by said collapsible tubes to vary the spacing between said ends and thereby apply tension and compressive stress on the respective collapsible tubes.

2. In a charge measuring device, a tube of given volume between its opposite ends, control valving at said opposite ends comprising a pair of collapsible tubes having passages therethrough in end to end axial succession with the first mentioned tube, means connecting the opposite ends of the first mentioned tube with the collapsible tube ends adjacent thereto, each collapsible tube having an intermediate flexible wall which flexes upon itself to close the tube passage in response to axial compression applied at the ends thereof and flexes outwardly to open the tube passage in response to axial tension applied at said ends and means to move one end of each collapsible tube toward and from the other end thereof for imposing compression and tension stresses on its intermediate flexible wall.

3. A charge measuring device according to claim 2 wherein said means to move the tube ends is arranged to move the tube ends in unison and imposes compressive stress on the wall of one collapsible tube concurrently with the relief of compression stress on the wall of the other collapsible tube whereby the passage through either tube is closed while the passage through the other tube is opened and vice versa.

4. A charge measuring device, including a pair of collapsible tubes each of which folds upon itself in a region intermediate its opposite ends to restrict the passageway therethrough in response to a decrease in the spacing between its opposite ends, a tube of given volume having its opposite ends in communication with the passages respectively of said pair of collapsible tubes and means operative to control the space between the opposite ends of said collapsible tubes.

5. In a charge measuring device, a chamber of predetermined volume to receive a charge of material to be measured, a collapsible tube having intermediate its opposite ends a foldable portion which restricts the passage therethrough in response to axial compression imposed thereon by relative movement of said opposite ends toward one another, a connection between the collapsible tube and said chamber as a dump opening therefor and selectively operable control means imparting relative end movement to said collapsible tube.

6. Loading equipment including a pair of fixedly spaced apart mounting plates carrying groups of tubular nipples, a bundle of tubes positioned within the space between said plates with each tube in end to end succession with co-operating tubular nipples respectively carried by the two mounting plates, flexible couplings joining opposite ends of the tubes with adjacent ends of co-operating tubular nipples and each having a flexible annular wall arranged for lateral deflection to constrict the passage therethrough in response to axial compression thereon and means mounting said tube bundle for movement between said plates in alternate directions and imposing axial compression stress on said couplings selectively at either of the opposite ends of said tubes.

7. Loading equipment including a bundle of parallel measuring tubes, inlet and outlet elementse fixedly spaced apart at opposite ends of the tubes, flexible tubular couplings connecting said elements with adjacent tube ends and each coupling comprising an annular wall having intermediate its length a lateral offset bend which is foldable upon itself to constrict the passageway therethrough upon movement toward one another of the wall portions at opposite ends of the intermediate bend and mechanism for imparting relative travel between the tube bundle and said elements in selective opposite directions axially of the tubes for controlled constriction of the coupling alternately at opposite ends of the tube bundle.

8. In a machine for disposition above the upper header of a bank of vertically disposed tubes and for loading measured charges of material in such tubes, a bottom plate to be superposed in face to face relation with the header and having a group of upstanding nipples arranged for alignment with the tubes to be loaded, a filling hopper having a floor plate and a group of depending nipples in vertical alignment with said upstanding nipples respectively, connections mounting said plates in fixed vertically spaced apart relation, a bundle of measuring tubes positioned within the space between said plates with the opposite tube ends vertically aligned and axially spaced from adjacent ends of the upstanding and the dependent nipples, power actuated means suspending the tube bundle for vertical travel to vary the end spacings between said tubes and nipples, flexible couplings joining opposite tube ends with said nipples and bridging the end spacings therebetween and each having an intermediate bendable and laterally offset wall passage responsive to a decrease in the end spacing which it bridges for the bending thereof to constrict said passage.

9. A machine according to claim 8, said bundle of measuring tubes corresponding in number and disposition to those within equal sectors of a circular bank of tubes to be loaded, a vertical locating pin depending downwardly from the machine at the sector apex of the tube bundle for reception within a bearing socket centrally of said circular bank, said pin constituting a locating axis about which the machine can be swung to overlie selected sectors of said circular bank.

10. A machine according to claim 8 wherein said connections which mount the plates in fixed vertically spaced apart relation are adjustable for setting such fixed spacing in relation to the length of the tubes of the bundle, with the flexible couplings at opposite tube ends having their intermediate portions constrictively bent in alternate relation in upper and lower sets respectively.

11. A machine according to claim 10 wherein the tubes of the bundle are each of a given fixed length.

12. A machine according to claim 10 wherein the tubes of the bundle are each a telescopically fitted pair of tubes and are adjustably mounted for changing their telescopic overlap to thereby vary the measure of tube volume.

13. In a charge measuring device of the character described, a bundle of feed valving tubes, each having a flexible annular wall of elastic deformable material molded to a free shape which includes a laterally offset bowed portion intermediate its ends and capable of a folding action in compensation for relative axial travel of said ends and tube locating means holding the tubes of said bundle in closely adjacent side by side assembly with the bowed portions in lateral alignment with one another and laterally offset in the same direction for lateral clearance and nested relation with one another upon their concurrent folding action.

14. In a valving element of the character described, a preshaped tube of molded elastic deformable material having a recurving outwardly bowed portion intermediate its ends and whose bowed annular wall bends to vary interior tube space in response to relative axial movement of said ends, said annular wall of the outwardly bowed portion being of substantially D-shape in transverse section and being stiffened in the two corner regions of its transverse D-shape for a greater resistance to bowed wall collapse near said corner regions than other regions transversely removed from the corner regions.

15. A valving element of the character described, comprising a tubular conduit having end and intermediate portions axially offset one from another, the wall of the intermediate conduit portion being constituted by an annular wall of deformable flexible material which folds upon itself in response to axial travel of the conduit end portions one toward the other to thereby constrict conduit space therein and a stiffening formation in one region of said wall rendering said region relatively resistant to wall folding deformation and normally preserving bleed clearance passage through said intermediate portion when the conduit space therein has been constricted by such wall folding deformation.

16. A valve including an elongated hollow body of flexible material, said body including an intermediate body portion, end portions adjoining said intermediate body portion, said intermediate body portion including longitudinally extending and substantially parallel surfaces which form an unrestricted passage in said intermediate body portion, said substantially parallel surfaces each being curved laterally relative to the longitudinal axis of said body to thereby displace said intermediate body portion laterally relative to the longitudinal axis of said body whereby a force applied longitudinally along the axis of said body collapses said body at said intermediate portion in the direction of displacement of said intermediate portion relative to said longitudinal axis to close off flow through said passage in said intermediate body portion.

17. A valve mechanism for controlling flow in a conduit including, paired hollow bodies of flexible material mounted in spaced relation in the conduit which bodies shut off flow through the conduit when either of them is collapsed by a force in a direction along the longest dimension of said bodies, each of said bodies including, end portions for connection with the conduit, passages in said end portions of each body, an intermediate portion in each of said bodies connecting said end portions, said intermediate portions of each body being recessed longitudinally so that two substantially parallel surfaces are provided in each of said intermediate portions, said surfaces in each of said intermediate portions defining an unrestricted passage in each of said intermediate portions which communicates with said passage in said end portions with which said intermediate portions are connected, said surfaces in each of said intermediate portions having at least a portion thereof curved longitudinally so that said surfaces are displaced laterally toward one side relative to the longitudinal axis of said bodies whereby a force applied longitudinal of said bodies collapses said bodies in the direction of displacement of said intermediate portion to shut off flow through said valve, and means for moving the conduit which is connected between said spaced valve bodies to apply a force longitudinally of said bodies to open and close them.

18. A mechanism connecting a conduit with a source of material supply whereby the conduit may be continuously filled with a regulated amount of material and the material then discharged from the conduit without disconnecting the conduit from the supply source including a conduit, valve means at each end of said conduit, means to reciprocate said conduit along its longitudinal axis, said valve means including bodies formed of resilient material having end portions with a passage therethrough, said bodies each having an intermediate portion with substantially parallel surfaces curved along the longitudinal axis of said body and forming an unrestricted passage communicating with said passage in said end portions, said substantially parallel curved surfaces defining a portion of said valve which tends to collapse to close off flow when a longitudinal force is applied on said valve body, said reciprocating means acting to apply a force alternately on said valves whereby the passage in said intermediate portion is alternately opened and closed so that the conduit may be initially filled and then discharged without disconnecting it from its supply source.

19. A mechanism for measuring the flow of material filling a container including a conduit of predetermined size, a valve of flexible material connected on each end of said conduit, and means for reciprocating said conduit whereby a force is exerted longitudinally on said flexible valves to collapse one of said valves and to open the other of said valves, wherein each of said valves of flexible material includes a hollow body, each of said bodies including end portions, one of which is for connection with said conduit, an intermediate portion extending between said end portions, said intermediate portion being displaced laterally along the longitudinal axis of said body whereby movement of said conduit against either of said bodies collapses said intermediate portion in the direction it is displaced and closes off flow through said valve body.

References Cited in the file of this patent

UNITED STATES PATENTS

| 2,444,449 | Kearny | July 6, 1948 |
| 2,565,903 | Lellweger | Aug. 28, 1951 |

FOREIGN PATENTS

| 24,326 | Great Britain | Dec. 6, 1899 |